United States Patent
Gong

(10) Patent No.: US 10,295,021 B2
(45) Date of Patent: May 21, 2019

(54) INTERNAL COMBUSTION ENGINE PROPULSION METHOD AND CORRESPONDING TRANSMISSION DESIGN

(71) Applicant: TUSKEGEE UNIVERSITY, Tuskegee, AL (US)

(72) Inventor: ShaoWei Gong, Tuskegee, AL (US)

(73) Assignee: Tuskegee University, Tuskegee, AL (US)

( * ) Notice: Subject to any disclaimer, the term of this patent is extended or adjusted under 35 U.S.C. 154(b) by 175 days.

(21) Appl. No.: 15/207,237

(22) Filed: Jul. 11, 2016

(65) Prior Publication Data
US 2017/0102068 A1   Apr. 13, 2017

Related U.S. Application Data

(60) Provisional application No. 62/191,220, filed on Jul. 10, 2015.

(51) Int. Cl.
*B60R 16/023* (2006.01)
*F16D 15/00* (2006.01)
(Continued)

(52) U.S. Cl.
CPC .......... *F16H 3/089* (2013.01); *F16D 23/04* (2013.01); *F16H 3/10* (2013.01); *F16D 11/14* (2013.01);
(Continued)

(58) Field of Classification Search
CPC ..... B60R 16/0236; F16H 3/089; F16H 3/083; F16H 63/304; F16D 15/00
See application file for complete search history.

(56) References Cited

U.S. PATENT DOCUMENTS 2,514,569 A * 7/1950 Thure ................ F16D 15/00
192/38
3,707,884 A * 1/1973 Go .................... F16D 21/04
192/44
(Continued)

FOREIGN PATENT DOCUMENTS

GB    190620127 A * 10/1907
GB    190705422 A * 11/1907 ............ F16H 3/083

OTHER PUBLICATIONS

Taylor, "Science review of internal combustion engines," Energy Policy 36 (2008) 4657-4667.
(Continued)

*Primary Examiner* — Sherry L Estremsky
(74) *Attorney, Agent, or Firm* — Hogan Lovells US LLP

(57) ABSTRACT

A case-emphasized propulsion method improves vehicle fuel efficiency. The ratio of the most-used speed to the most-desired speed of an IC engine is employed to control the engine to always run at its optimal working state with an efficient single-stage gear transmission. The propulsion method used with different brands of IC engines demonstrates a reduction in fuel consumption between 5 and 39%. An n-ratio automatic single-stage gear transmission implements the propulsion method. The transmission design executes the proposed propulsion method as well a continuous transmission, but it can also increase the propulsion efficiency about 8 to 18% when applied to replace traditional automatic transmissions or continuously variable transmissions in vehicle drivetrains.

16 Claims, 14 Drawing Sheets

(51) Int. Cl.
   *F16H 3/089* (2006.01)
   *F16D 23/04* (2006.01)
   *F16H 3/10* (2006.01)
   *F16H 63/30* (2006.01)
   *F16D 11/14* (2006.01)
   *F16D 23/06* (2006.01)
   *F16D 27/02* (2006.01)
   *F16D 27/118* (2006.01)
   *F16D 41/08* (2006.01)

(52) U.S. Cl.
   CPC .............. *F16D 23/06* (2013.01); *F16D 27/02* (2013.01); *F16D 27/118* (2013.01); *F16D 41/088* (2013.01); *F16D 2023/0643* (2013.01); *F16D 2023/0687* (2013.01); *F16H 2063/3093* (2013.01)

(56) References Cited

U.S. PATENT DOCUMENTS 3,871,243 A * 3/1975 Bundschuh ............. F16H 3/083
  74/357
5,020,361 A * 6/1991 Malecki ............. B60R 16/0236
  116/DIG. 20

OTHER PUBLICATIONS

K.A. Osman et al., "Optimised Vehicle Velocity Control and Shift-Point Selection Using Neural Networks," Smart Engineering Systems, vol. 8, pp. 709-715.
R.D. Maugham et al, "Preliminary Investigation of Dilution Strategies to Control Engine Torque During Transient Events," 2001 Fall Technical Conference of the ASME Internal Combustion Engine Division, ICE—vol. 37-3, pp. 35-43.
S. Sasaki, "Toyota's Newly Developed Hybrid Powertrain," Proceedings of 1998 International Symposium on Power Semiconductor Devices& ICs, Kyoto, pp. 17-22.
S. Ariyonol et al., "Adaptive Neural Network Optimisation Control of ICE for Vehicle with Continuously Variable Transmission," International Conference on Intelligent and Advanced Systems 2007, pp. 257-262.
K. Hayashi et al., "Neuro Fuzzy Transmission Control for Automobile with Variable Loads," IEEE Transactions on Control Systems Technologies, vol. 3, No. 1, Mar. 1995, pp. 49-53.
H. Scherer et al., "ZF New 8-speed Automatic Transmission 8HP70—Basic Design and Hybridization," SAE Int. J. Engines, vol. 2, Issue 1, pp. 314-326.
K. Lorenz et al., "Interactive Engine and Transmission Control," 1988 International Congress on Transportation Electronics, pp. 25-31.
G. Bednarek et al., "Six-speed Automatic Transmission on the Opel Astra and for the Global Market,"—ATZautotechnology 0612009 vol. 9, pp. 39-45.
B. Hohn, "Trends for future drive lines in Europe," Proceedings of the International Conference on Mechanical Transmissions, (ICMT 2001), abstract only.
G. Wu et al., "Development Survey of Automobile Automated Transmission," J. Tongji Univ. 38(10): 1478-1483, English language abstract.
G. Wu et al., "Development Survey of Automobile Continuously Variable Transmission Technique and Application Aspects," J. Tongji Univ. 37(12: 1642-1647.
N. Srivastava et al., "A review on belt and chain continuously variable tarnsmissions (CVT): Dynamics and control," Mechanism and Machine Theory 44 (2009) pp. 19-41.
D.B. Gilmore, "Fuel economy goals for future powertrain and engine options," Int. J. of Vehicle Design. vol. 9, No. 6, 1988, pp. 616-631.
C.A. Amann et al., "The powertrain, fuel economy and the environment," Int. J. of Vehicle Design, vol. 7, No. 1/2, 1986, pp. 1-34.
E.F. Obert, "Internal Combustion Engines and Air Pollution," Intext Educational Publications, 1973, abstract only.
E.E. Shipley, "Loaded Gears in Action," Gear Handbook, 1962, McGraw-Hill Book Company, Inc., pp. 14-1-14-60.
G. Lechner et al., "Automotive transmissions: fundamentals, selection, design and application," Springer.
D. Newnan et al., "Engineering Economic Analysis International," Oxford Univ. Press, 2008, abstract only.
Gong, "A generalized IC engine propulsion method and corresponding transmission design for impriving venicle fuel efficiency," Eur. Transp. Res. Rev. (2014), 6, pp. 225-239.
F. Buscemi, "Trends in Automobile Transmission," Gear Technology, Jul./Aug. 2006, pp. 24-26.

* cited by examiner

FIG. 11
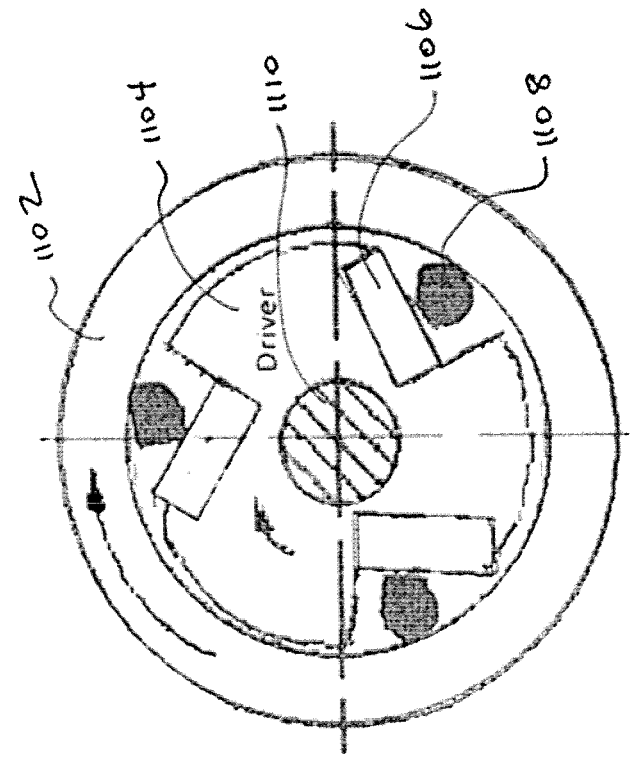
a. Gear ball-clutch in separated state
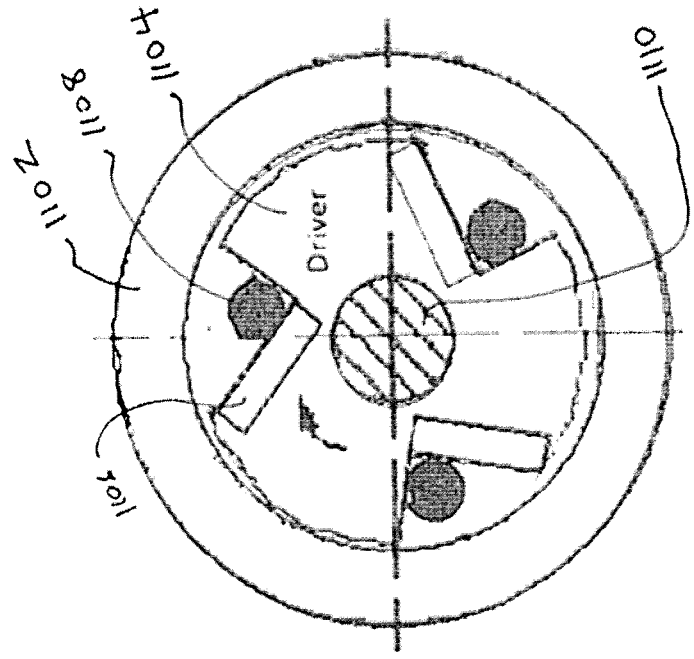
b. Gear ball-clutch in fixed state a. Gear ball-clutch in separated state b. Gear ball-clutch in fixed state

INTERNAL COMBUSTION ENGINE PROPULSION METHOD AND CORRESPONDING TRANSMISSION DESIGN

CROSS REFERENCE TO RELATED APPLICATIONS

This non-provisional application claims the benefit of U.S. Provisional Application No. 62/191,220 filed on Jul. 10, 2015. The entire disclosure of the prior application is hereby incorporated by reference herein in its entirety.

BACKGROUND OF THE INVENTION

In order to conserve crude oil and out of concern for the environment, the automotive industry is required to ramp up production of more fuel-efficient vehicles on a tight timeline. As an essential power conversion system for vehicle propulsion, the technology of the internal combustion ("IC") engine is the focus of attention for attempting the improvement of vehicle efficiency. It is known that the technology of the IC engine has its advantages as compared with other energy conversion technologies used on vehicles.

The IC engine is a proven cost-effective technology with a long history of dominating the markets of power generation, indicating that the technology has stood firm with the test of time. Different from other indirect technologies that convert fuel in the following manner: heat energy→electrical energy→mechanical energy or chemical energy→electrical energy→mechanical energy, an IC engine can directly convert the heat energy of fuel→mechanical energy; thus, t avoids the reduction of fuel efficiency during the process of conversion. The IC engine possesses competitive ratios of power/weight and power/volume, and can also run without pollution if proper fuel is used. Even if fossil fuel is used up in the future, non-fossil fuel replacements cat be easily found. As a result, the transfer from the fossil fuel era into the non-fossil fuel era will probably occur smoothly with a convenient and inexpensive change of the power-generating method.

Unfortunately, the efficiency of an IC engine is still low. An IC engine may only run at around 30% of fuel efficiency. For decades, scientists have devoted great efforts to improve the efficiency of IC engines in deliberating of many different approaches. Currently, the general ways to improve the fuel efficiency of IC engine may be understood from Taylor's work. To have overall understanding of the current IC engine technology, Taylor conducted a systematic review of the IC engine technology. He suggested that there could be 6-15% improvement in internal combustion fuel efficiency in the coming decade. Taylor stated that developments beyond the next decade were likely to be dominated by four topics: emission legislation and emission control, new fuels, improved combustion; and advanced concepts for energy saving IC engines could achieve higher efficiency to meet the requirements of the raised standards with the development of new technology as listed in the above four topic. However, upon an investigation of the prior art, it is believed that at least one more topic may also be considered as an important way to improve the performance of IC engines, that is, the topic of increasing the fuel efficiency of IC engines. It is known that the fuel efficiency of an IC engine is not only related to the efficiency of the engine itself but also related to the efficiency of the operating environment. If a high-efficient engine is arranged to run in an improper operating environment, the fuel efficiency in application will remain low.

It is acknowledged that an IC engine could run at its most efficient state at certain range of engine speeds measured in revolutions per minute (RPM) which produces peak power, and maximizing fuel efficiency by always allowing the engine to run at the optimum RPM. For decades, scientists have tried to find the best way to use the concept for better fuel efficiency. The trend of how to use the working properties of an IC engine to achieve optimal fuel efficiency can be understood by the following concise discussions of the prior art.

Osman et al, noted that it was possible to improve the efficiency of conventional vehicles by intelligent control of the drivetrain. They therefore modeled IC engines using neural networks for fuel saving by intelligent control of the transmission. The initial results they presented showed that considerable fuel savings could be achieved by intelligent selection of optimal shift points.

Maugham et al. considered that, due to low frictional and pumping losses, a gasoline engine's fuel efficiency could be maximized at low speed, high torque conditions. They indicated that a continuously variable transmission ("CVT") allowed a drivetrain controller the freedom to develop a required output power at a range of engine torque and speed conditions. This flexibility can be used to maximize fuel efficiency. Since controlling a gasoline engine in this range could compromise transient vehicle response, the preliminary work had been taken by them to investigate the potential of charge dilution to control steady state engine torque. The outcomes of their research showed the potential to maintain economy gains with a CVT drivetrain while improving a vehicle's drivability.

Sasaki introduced Toyota's new hybrid drivetrain system that included a drivetrain that consisted of a planetary gear mechanism for dividing the drive force and two motor/generators. Such a system is based on the concept that uses computer control to optimize engine fuel consumption and to minimize exhaust emissions.

Ariyono et al. presented their research about the continuously variable transmissions. They considered that CVT could provide a wider range transmission ratio, good fuel economy, smoothly shifting of ratio, and excellent drivability. They also noted that, with CVT, it was possible to maintain a constant engine speed based on either its optimum control line or maximum engine power characteristic. With their work, the use of Adaptive Neural Network Optimization Control ("ANNOC") was brought in to indirectly control the engine speed by adjusting pulley CVT ratio.

Hayashi et al. developed a transmission controller for an automobile to deal with the issue of variable loads. Such a development is, actually, an automated manual gear-shift system. Neuro and fuzzy methods are adopted for the controller and the interface between a vehicle operator and an automobile to make the operator feel comfortable even when automobile loads change while traveling.

Scherer et al. introduced the six-speed automatic transmission for passenger cars developed by ZF Freidrichshafen AG ("ZF") in 2001. They mentioned that, with regard to the increasing requirements especially in reduction of $CO_2$ emissions, a new eight-speed transmission is now under development in ZF. The main targets for this transmission family are a further significant reduction in fuel consumption and emissions, good driving performance and state-of-the-art driving comfort. The authors considered that the new developments showed that the technology of "conventional" automatic transmissions with torque converter and planetary gear sets still presented a lot of potential.

Lorenz et al. described that the BMW 750i had interconnected electronic systems to control the engine and the automatic transmission. They illustrated the concept and interplay of the drivetrain, the driving stability electronics, and the individual functions, and also described the measures taken to make the drive-management system reliable.

Bednarek et al. introduced GM's new six-speed front wheel drive (FWD) family of automatic transmissions. They reported that the new transmission had a wide overall ratio spread of 6.1:1 which allowed for optimum adaptation of the drivetrain for various categories of vehicles. The authors considered that the use of the torque converter lockup clutch with electronically controlled slip could lead to the optimum use of the fuel in vehicles.

The following prior art also conducted an investigation about existing transmission and drivetrain technologies with corresponding analysis of fuel efficiency and prediction of the trends of future development.

Höhn described the future trends of automotive drivetrains in Europe. He pointed out that automotive transmissions for passenger cars in Europe have changed continuously in the last 20 years. The ratio range for transmissions has increased more and more. He believed that the trend to more gears for automatic transmissions and manual gear boxes would be on-going. He predicted that, in the future, different concepts would be developed, and semi-automated manual gearboxes, CVTs, and hybrid systems would be applied even though in the past only manual gearboxes and automatic transmissions were on the market.

Wu and Sun introduced five major automated transmissions in international automobile markets regarding their working principles and development history as well as the state-of-the-art of the automated transmissions. Advantages and disadvantages of automated transmissions were compared, and development perspective was presented. For convenience, representative manufacturers and the application status in the Chinese market are listed in an accompanying information disclosure statement.

Wu and Sun also investigated the development history and research status of the continuously variable transmission. Particularly, they introduced the basic structure of metal v-belt CVT, and compared the structure and working principle of the metal belt and chain. With their research, the principle and performance of the mechanical-hydraulic control system and electro-hydraulic control system, especially the slip control strategy developed recently were explained, and future CVT development trend were predicted.

Buscemi discussed that, today, drivers could have more transmission options than before as automatics and manuals are accompanied by automated manuals ("AMT"), dual clutch transmissions ("DCT"), and continuously variable transmissions. The author stated that the most important objective and the main goal for transmission engineers would be to improve fuel efficiency and to perk up overall drivetrain efficiency by reducing drag losses.

Srivastava and Hague studied the significant developments of vehicle transmissions over the last two decades. They considered that a CVT would offer a continuum of gear ratios between desired limits, which would consequently enhance the fuel economy and dynamic performance of a vehicle by better matching the engine operating conditions to the variable driving scenarios. They mentioned that the potential of CVT had not been realized in the mass production of vehicle although it could play a crucial role to improve vehicle fuel economy, and discussed the challenges and critical issues for future research on modeling and control of CVTs.

Gilmore emphasized that efficiency goals could represent one of the key factors governing drivetrain choice. With specifying three developments, the conventional four-speed manual or automatic transmission was competed, and the fuel consumption associated with continuously variable ratio and infinitely variable ratio automobile transmissions were simulated in the situations of urban and highway constant-speed operation.

Amann reviewed the historical growth in average drivetrain efficiency of the US passenger-car fleet, and found that imposition of emission control caused a temporary retreat, but with the introduction of the catalytic converter, growth was restored to bring a dramatic decrease in exhaust emissions. He mentioned the dominant position of the gasoline engine and predicted the continuous improvement of transmission.

The prior art shows the essential ways to apply the aforementioned concept to improve the efficiency of an IC engine, i.e., the vehicle fuel efficiency, with the development of different control schemes and the introduction of new multiple-speed AMTs, DCTs, and various CVTs. However, through study of the prior arts, it is clear that several issues remain to be resolved.

It is noted that the prior art was developed with the concept to approach the optimal fuel efficiency by controlling the IC engine to run in the RPM range around the maximum power since the range is close to the congregation of the minimum fuel consumption. Such a concept may not always work because of the following reasons.

The torque decreases with the increase of speed after the maximum torque is reached. Since the output power is the product of the two, the maximum power may almost stay unchanged in a large range of RPMs. This means that there are many RPMs of maximum power; therefore, it is difficult to use the above-mentioned concept to approach optimal fuel consumption.

From the study of the working properties of IC engines, it has been found that there are basically two different IC engine working profiles. The first profile is a congregation of the minimum fuel consumption RPM close to the maximum output torque RPM. The second profile is no congregation of the minimum fuel consumption RPM near the maximum output torque RPM, and the fuel consumption rate simply rises with the increase of RPM. This means that the concept discussed in the prior art can only work with the first profile.

The prior art did not identify the necessary condition to ensure that the control method is workable to control a particular IC engine in practice.

Even though the prior art described that the use of CVTs could increase the fuel efficiency of an IC engine, they did not specify if CVTs could handle power transmission with satisfactory mechanical efficiency.

The prior arts did not present a case-emphasized propulsion control scheme to satisfy all primary needs for every single vehicle yielding the statistic data of the survey that how the vehicle could be used.

There is no claim of a n-ratio automatic transmission formed by n-pair of single-stage gears that has high mechanical efficiency to conveniently approach the case-emphasized propulsion control scheme with a generalized solution to take advantage of the IC engine's working characteristics yielding the data of survey for all different cases, and at the same time, to provide a comfortable operation similar to the automatic transmission to make a gear transmission an almost CVT.

It is important to note that, so far, the fuel efficiency of an IC engine equipped on a vehicle coupled with a drivetrain (either traditional gearbox/clutch transmission or CVT) is yet to be satisfactory. It is considered that if the above issues can be resolved, it could lead to more efficient fuel consumption. In such a situation, it is necessary to comprehensively understand the IC engine working properties to conduct further development.

SUMMARY OF THE INVENTION

According to the present invention, and based on an analysis of working profiles of internal combustion engines, a case-emphasized propulsion method is generalized to improve vehicle fuel efficiency. With the method of the present invention, the ratio of the most-used speed to the most-desired speed of an IC engine is employed to control the engine to always run at its optimal working state with an efficient single-stage gear transmission. Embodiments of the propulsion method of the present invention with different brands of IC engines in the marketplace demonstrate that the present method could reduce engine fuel consumption between 5 and 39%. A design of an n-ratio automatic single-stage gear transmission implements the case-emphasized propulsion method according to the present invention. The transmission design of the present invention executes the proposed propulsion method as well a continuous transmission, but it can also increase the propulsion efficiency about 8 to 18% if it is applied to replace the traditional automatic transmissions or continuously variable transmissions in vehicle drivetrains.

BRIEF DESCRIPTION OF THE DRAWINGS

FIGS. 11(a)-16 show alternative designs of a mating controller according to the present invention.

DETAILED DESCRIPTION

IC engine tests and the first working profile of an IC engine are now described.

To ensure that an IC engine can constantly perform in the optimal working state, it is necessary to know the general relationships of the engine speed versus its fuel consumption and the engine speed versus its output torque. Such relationships can be basically learned through engine tests. Usually, there are two types of tests: tests at variable speed, and tests at constant speed. Further, the variable speed tests can be divided into full-load tests and partial-load tests. The constant speed tests are conducted mainly to determine specific fuel consumption. The following discussions give the basic ideas about the traditional engine tests.

Variable-speed tests with spark-ignition (SI) engines are now described.

Figure 1:
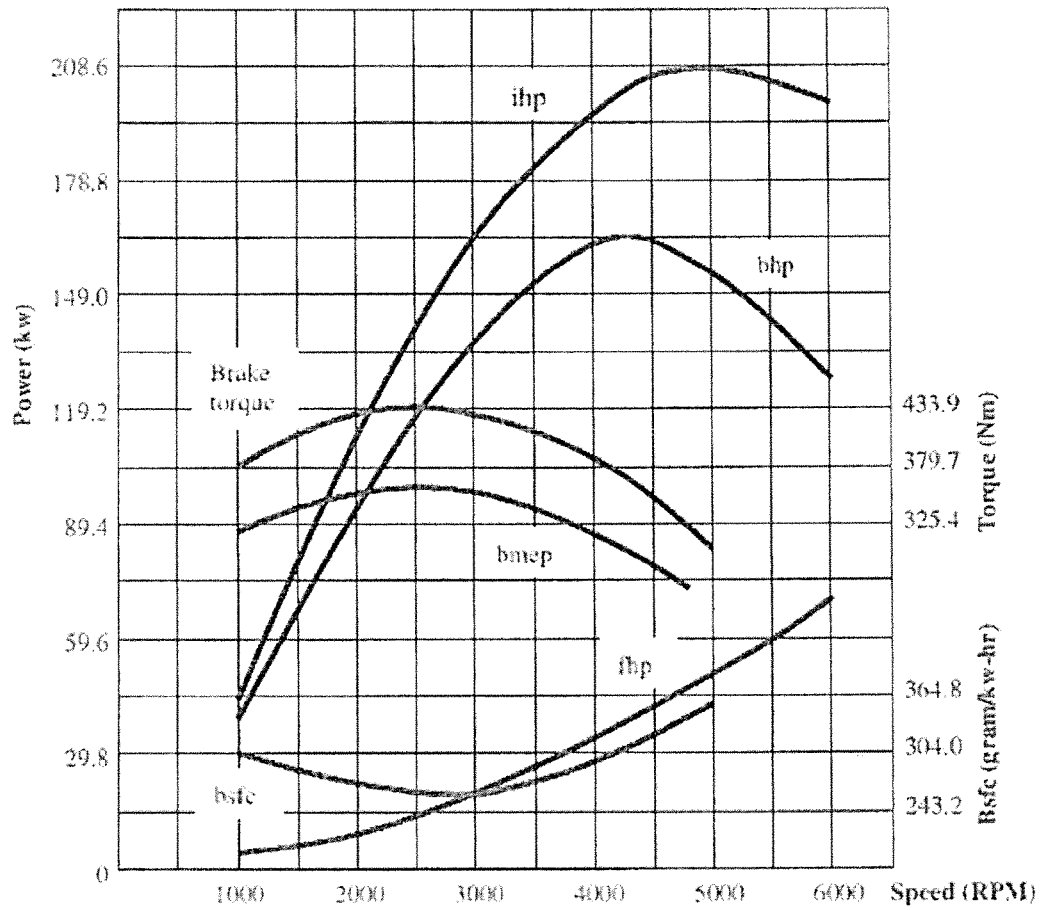
FIG. 1 shows a variable-speed test of an automotive spark-ignition engine at wide-open throttle.

For the maximum power test on the SI engine, the throttle is fully opened and the lowest speed is maintained by the torque of the brake. When the engine is running in approximation of temperature equilibrium, the fuel consumption is detected. FIG. 1 presents the record data of the variable-speed test for an automotive SI engine. The profile in FIG. 1 is developed with the consideration of atmospheric conditions with the correction factor (CF).

Referring to FIG. 1, it can be known that the torque and mean effective pressure (bmep) are mountain-like curve versus speed; the minimum specific fuel consumption bsfc) is around the peak location of the mountain-like curve of the torque; the friction horsepower (fhp) rises with the increase of speed, and it rises rapidly because of the reciprocating-piston mechanism; and the indicated horsepower (ihp) is the sum of the horsepower (bhp) and the friction horsepower, and the horsepower is the product of the torque and speed.

To conduct a partial-load at variable-speed, for example, 1/N of the load, the brake and throttle are adjusted to achieve 1/N of the maximum power at each speed. The curve of the brake horsepower versus speed could be obtained without running the test by merely dividing the maximum power by N. However, fuel consumption will vary accordance with the changes of the load and throttle.

Variable-speed tests with the compression-ignition (CI) engine are now described.

It is more difficult to conduct the full-power test of a CI engine at variable speeds than the SI engine. Through the same procedure of the SI engine test, the brake torque is adjusted until the lowest operating speed is reached with the fuel pump injecting a quantity of fuel to make the exhaust gas slightly colored. This indicates that the engine is near the maximum load since some of the fuel is being wasted in smoke. This is used to define the full-load at different stages.

Figure 2:
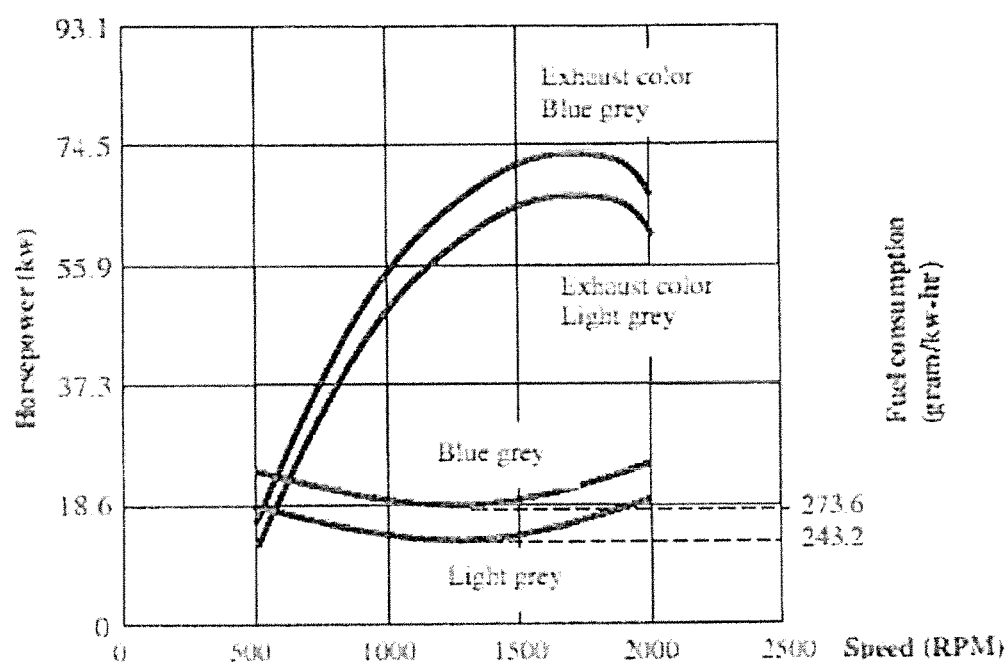
FIG. 2 shows a variable-speed test of a compression-ignition engine with different interpretations of a full load.

In the CI engine, there is no sharp limit and the color of exhaust smoke is a good way to identify the maximum load. The profile of CI engine tests is shown in FIG. 2. The fuel consumption curve in FIG. 2 shows that the minimum fuel consumption is around the midrange of the engine speed.

Variable-speed tests of a CI engine at partial loads are done in the same as a SI engine. It should be emphasized that the fuel consumption curve developed with either the full-load or the part-load tests can only be used for the case which has the same working condition and load as the tests; otherwise, the profile of tests can only be used as a rough reference.

With this kind of profile, the minimum fuel consumption RPM is close to the maximum output torque RPM which is usually the peak of power RPM. With the display of effective working range of the engine, the depicted profile of this kind of IC engine will demonstrate that the fuel consumption simply achieves the minimum value around the maximum torque RPM.

The constant-speed test is now described.

A constant-speed test is done with a variable throttle from no-load to full-load to have smooth curves. Starting with no-load, the throttle is adjusted to get the designated speed. After the first run, the load is added and the throttle is opened wider to maintain the same speed. The test continues until the last run of the full-load is made with the wide-open throttle. In a CI engine test, the last test would have smoke in the exhaust gas.

With reference to the aforesaid engine tests and corresponding test data profiles, the relationship between the engine speed versus the torque and the fuel consumption can be generally described as follows: at first, with the increase of the speed, the fuel consumption begins to drop and the torque begins to rise; when the engine speed runs into some positions of the midrange, the fuel consumption drops to the minimum value and the torque reaches its peak; and after the engine runs over this midrange of speed, the fuel consumption will increase and the torque will decline with the continuous increase of speed.

Through the aforementioned tests, the following two kinds of profiles can be recorded to show the working properties of IC engines.

The first working profile of an IC engine is now described.

The above profiles of FIG. 1 and FIG. 2 demonstrate the general properties of IC engine speed versus fuel consumption and torque through the tests for the SI type and CI type IC engines respectively. Such working properties of an IC engine can be widely seen with the specifications of IC engines in the marketplaces (refer below to FIG. 3 and FIG. 4). For better understanding, such a profile is defined as the first working profile of IC engine.

The second working profile of IC engine is now described.

Figure 5:
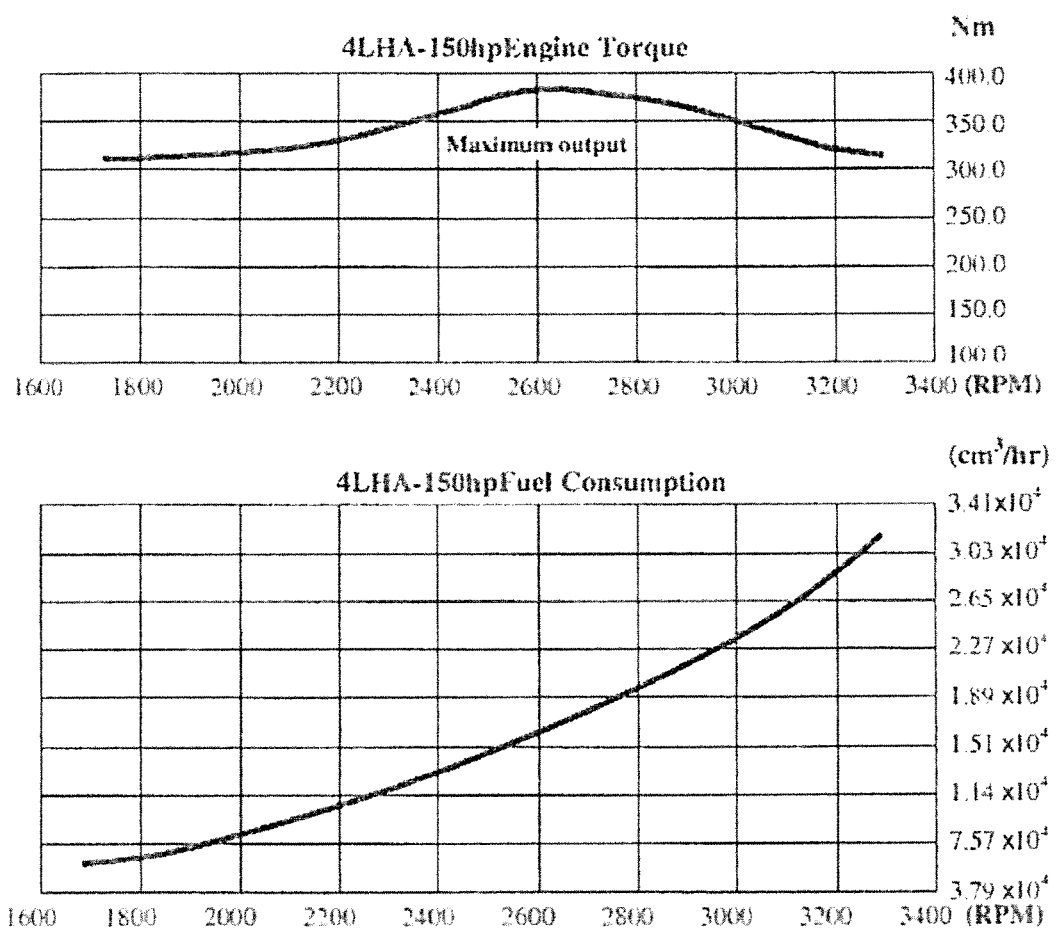
FIG. 5 shows the specification data and profile of Yanmar's 4LHA-150 hp diesel engine.

It is noted that there is still another kind of major working profile of an IC engine. For better understanding, this kind of profile is defined as the second profile of IC engine working properties. FIG. 5 shows the second working profile which is obtained with the tests of a Yanmar's 4LHA-150hp IC engine.

This kind of depicted profile can be seen with the specifications of many brands of IC engines in the market place. With the second profile, the minimum fuel consumption RPM is far away from the maximum output torque RPM. Therefore, for effective demonstration of the working range, depicted profile of this kind of IC engine will exhibit that the fuel consumption increases with the increase of the engine speed. Around the maximum torque, the fuel consumption rate is not close to the minimum value. As is mentioned previously, to control the IC engine running at the peak power RPM for minimum fuel consumption will not work with such a profile.

The propulsion method developed using the working profiles of IC engine is now described.

Based on the two kinds of working profiles of IC engines, a case-emphasized propulsion method can then be developed to achieve optimal fuel efficiency. To conduct the development, two terms are defined here for convenience.

First, it is known that, when an IC engine is applied for the propulsion of a vehicle, it may frequently do its regular work in several different working states. The frequently used working states are defined as the most-used working states. The speed and torque related to each of the most-used working states are defined as the most-used speed and the most-used torque.

Second, it is noticed that the most-used working states of an IC engine in a vehicle may be very different trot s most-desired working state. The most-desired working state is the state that the engine conducts the least fuel consumption. The speed and torque related to the most-desired working state are defined as the most-desired speed and the most-desired torque correspondingly.

A case-emphasized propulsion method developed by using the first profile is now described.

With the above observation from FIG. 1 to FIG. 4, it is clear that, the output torque of an IC engine may achieve the maximum value at certain speed range that is near the speed of the least fuel consumption. This type of profile is identified as the first kind of working profile of an IC engine.

Figure 6:
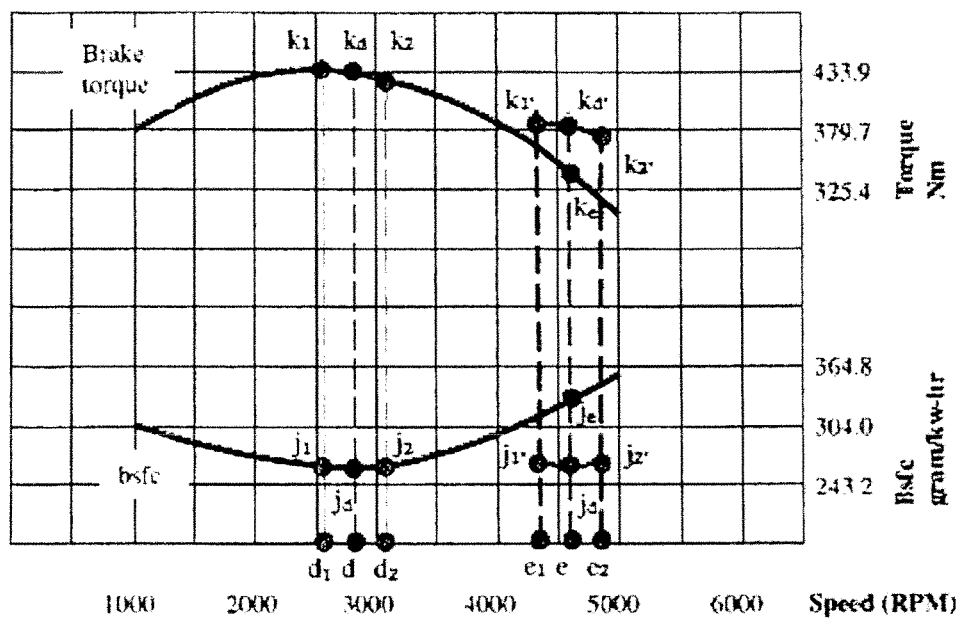
FIG. 6 shows the transmission speed and torque from engine shaft to gear pair shaft.

For better understanding of the working properties of an IC engine, the brake torque curve and bsfc curve in FIG. 1 are adopted here to conduct the following analysis (FIG. 6). FIGS. 1-4 and FIG. 6 indicate how the use of the unique relationships among engine speed, output torque, and fuel consumption can improve fuel efficiency. FIG. 6 demonstrates that the least rate of fuel consumption is around the range from speed $d_1$ to $d_2$ with corresponding brake torque from $k_1$ to $k_2$. Generally, it is known that an IC engine may not necessarily work in such a range. For example, if the engine associated with FIG. 6 is frequently working in the speed range between $e_1$ and $e_2$ with mean torque of $k_e$, then a case-emphasized propulsion method can be developed to make full use of the working properties of an IC engine.

A basic method of IC engine propulsion for improving fuel efficiency is now described.

With the case-emphasized propulsion method, in FIG. 6, the range $(e_1\text{-}e_2)$ is defined as the most-used speed range. The speed at point e is the mean of most-used speed, and it can be approximated by $$\text{Speed } e = \frac{\text{Speed } e_1 + \text{Speed } e_2}{2} \quad (1)$$

In FIG. 6, the range $(d_1\text{-}d_2)$ is considered as the most-desired speed range since fuel consumption is the lowest when an engine runs in this range. The speed at point d is the mean of the most-desired speed, and $$\text{Speed } d = \frac{\text{Speed } d_1 + \text{Speed } d_2}{2} \quad (2)$$

Figure 7:
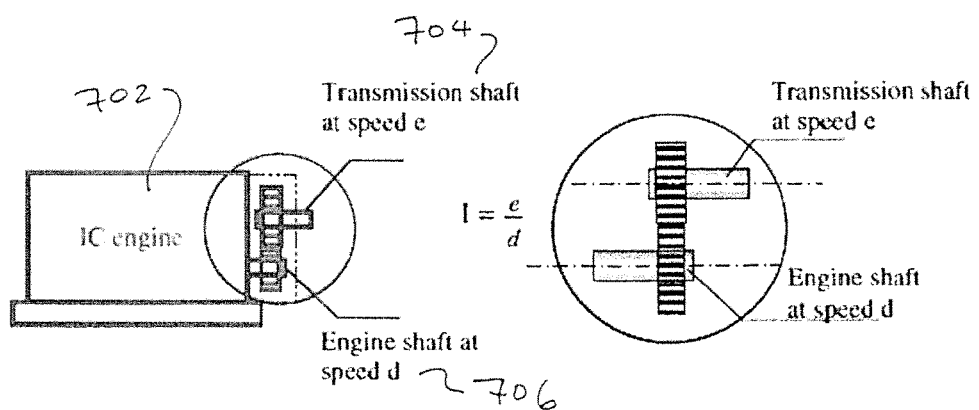
FIG. 7 shows the use of a gear pair to make an engine work at the most-desired speed.

By studying the characteristics of the relationship demonstrated in above figures, it is known that a high efficient gear transmission can be used to make the IC engine run in the most-desired speed range, and at the same time, to do the work in its most-used speed range. FIG. 7 shows the basic idea of the single-stage gear transmission. FIG. 7 illustrates an IC engine 702, an engine shaft 706 turning at speed d, and a transmission shaft 704 turning at speed e.

With this development of single-stage gear transmission, the transmission ratio is I, and $$I = \frac{e}{d} \quad (3)$$

With the transmission ratio, the most-desired speed at the engine shaft can be transmitted to the most-used speed at the output of transmission shaft, that is $$e = I\,d$$

At the same time, the transmitted torque from the engine shaft to the transmission shaft will be from $k_{d1}$ to $k_{d1'}$, and $$k_{d1'} = I\,k_{d1} \quad (4)$$

It is clear, if the transmitted torque $k_{d1}$, at the transmission shaft is larger than or equal to the original torque of the most-used speed $k_e$, then, it is possible for the IC engine to run at the most-desired speed d with the engine shaft and to do the work at the most-used speed e with the transmission shaft. With reference of FIG. 6, theoretically, the rate of fuel consumption will drop from $j_e$ to $j_d$.

With the above analysis of the design method, it appears that the IC engine can run in the most-desired speed with the lowest fuel consumption to do the work that originally should be done at the most-used speed. However, to ensure the proper application of the method, it is necessary to conduct the following analysis for the feasibility study.

Discussions of the feasibility of the propulsion method of the present invention including the necessary condition to implement the propulsion method are now described.

Since the propulsion of an IC engine is not only related to the engine speed but also to the engine output torque, to use the method, the transmitted output torque must be larger than or equal to the most-used torque as above-discussed, that is $$k_{d1} \geq k_e$$

or, $Ik_{d1} \geq k_e$ \hfill (5)

In practice, the condition (5) must be checked to ensure the application of the method, and the restriction is considered the necessary condition of the proposed propulsion method.

With study of the engine output torque and output speed, it appears that the mountain-like working curve of an IC engine make the propulsion method available. It provides the possibility to have a proper transmission ratio to develop a pair of output speed and torque to match the most-used speed and torque.

It is noted that, if the most-desired speed range is far away from the most-used speed, the transmission ratio could be relatively large. In such a situation, the output torque at the transmission output shaft may not match the most-used torque; thus, the proposed design method cannot be applied properly. However, in this case, by using a proper speed that is closer to the most-used speed as a replacement of the most-desired speed, it will make the transmission ratio smaller. In this way, although fuel consumption is slightly higher than the ideal situation, it will still take advantage of the working properties of an IC engine to achieve better fuel efficiency.

The high mechanical efficiency of gear transmission makes the development possible.

A gear pair is used to implement the above method; thus, it is necessary to check if the efficiency gain is significantly larger than the efficiency loss with the gear transmission. The following discussions will present the energy loss with the se of the gear pair.

The major energy loss with the propulsion method is caused by the use of the single-stage gear pair. To conduct the efficiency analysis of a gear pair, the following method may be used for basic understanding:

$$E(\text{efficiency}) = (100 - P)\% \quad (6)$$

$$P = \frac{50\mu(Hs^2 + Ht^2)}{\cos\alpha(Hs + Ht)} \quad (7)$$

$$Hs = (R_g + 1)\left\{\sqrt{\left[\left(\frac{R_o}{R_P}\right)^2 - \cos^2\alpha\right]} - \sin\alpha\right\} \quad (8)$$

$$Ht = \frac{R_g + 1}{R_g}\left\{\sqrt{\left[\left(\frac{r_o}{r_P}\right)^2 - \cos^2\alpha\right]} - \sin\alpha\right\} \quad (9)$$

Here, $R_g$ is the gear ratio, $R_o$ is the outside radius of gear (m), $r_o$ is the outside radius of pinion (m), $R_p$ is the pitch radius of the gear (m), $r_p$ is the pitch radius of the pinion (m), E is the efficiency of the gear pair (%), P is the power loss of the gear pair as a percentage of the input power (%), $\alpha$ is the pressure angle, and $\mu$ is the coefficient of friction.

If a pair of spur gears is used, and the gear parameters are: $\alpha=20°$, $R_g=1.2$, module=2, pinion teeth=25, gear teeth=30, and the gear is the full depth tooth type, it leads to $R_o=26$ mm, $r_o=22$ mm, $R_p=24$ mm, and $r_p=20$ mm. With the above formulas (9) to (12), the gear pair efficiency is higher than 99%. Further, since the friction coefficient for ball bearings is about 0.001~0.008, the efficiency of the one-stage gear pair is $G_n$, and $G_n>98\%$. Therefore, using one-stage spur gear pair is considered acceptable to implement the design method with this research. The same conclusion can also be obtained from different credited resources listed in an accompanying information disclosure statement.

Examples of efficiency gain with the propulsion method of the present invention are now described.

To verify the gain of efficiency with the propulsion method, several different IC engines made by different manufacturers in the market place will be used as examples to analyze if such a propulsion method really works.

Example 1 is an application using John Deere's 6068TF250 IC engine.

Figure 3:
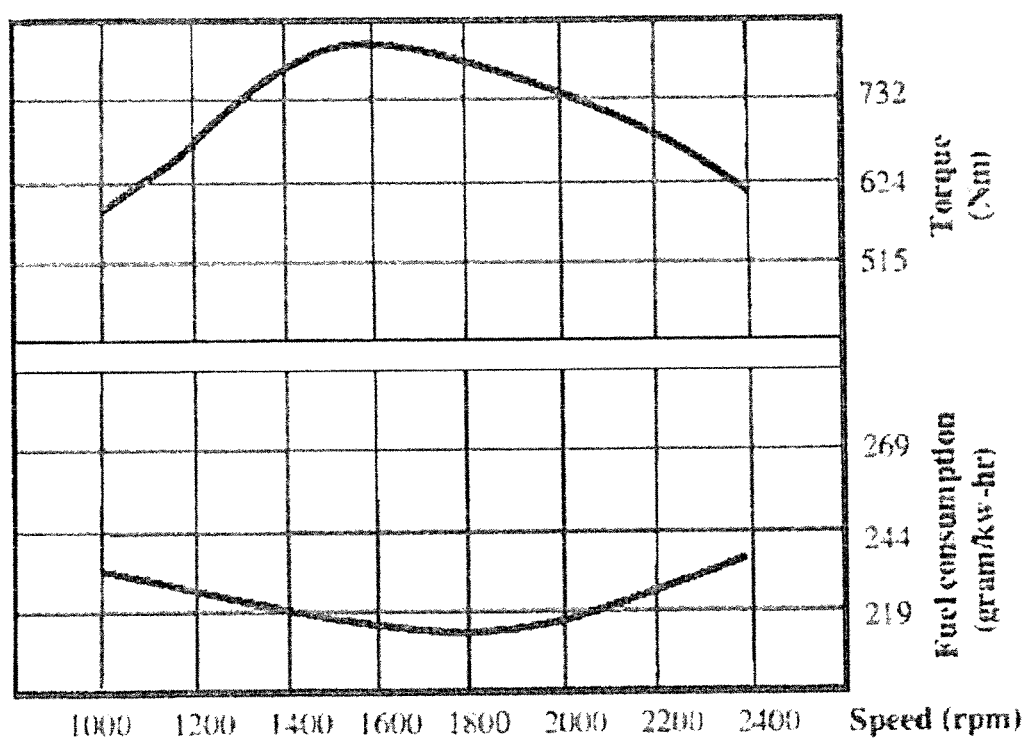
FIG. 3 shows the specification profile of John Deere's 6068 TF250 IC engine.

If a John Deere's 6068TF250 IC engine is used to implement the propulsion method, its profile in FIG. 3 can be used. With the reference of FIG. 3, if a specific case of most-used working state is designated with the most-used speed of 2300 RPM and most-used torque of 624 Nm, the corresponding fuel consumption is about 232 gram/kw per hour. With this kind of IC engine, the most-desired working state holds the speed of 1800 RPM and the torque of 746 Nm. At the most-desired working state, the fuel consumption is about 215 gram/kw per hour. With the proposed propulsion method, the transmission is $$I = \frac{e}{d} = \frac{23}{18}$$

When the engine shaft is at 1800 RPM with the output torque of 746 Nm, the gear pair shaft will be 2300 RPM with corresponding output torque about $$T_{2300\ RPM} = 746\frac{1}{I} = 584\ \text{Nm}$$

In this case, the torque changing ratio of reduction, $T_I$, will be about $$T_I = \frac{624 - 584}{624} = 6\%$$

If 5% of reduction of the output torque is considered acceptable, then the propulsion method may not be very suitable for this specific case to use John Deere's 6068TF250 IC engines since the output torque is much less than the torque required.

In this case, if 6% reduction of the output torque is still workable with the proposed method, the fuel consumption will decline about $$\eta_l = \frac{232 - 215}{232} = 7.3\%.$$

By subtracting the mechanical consumption of the added gear transmission (about 1~2%,) it can still hold the gain of fuel reduction around 5%. It shows that the improvement of fuel efficiency is significant.

Example 2 is an application using DEUTZ's BF4M2012 IC engine.

Figure 4:
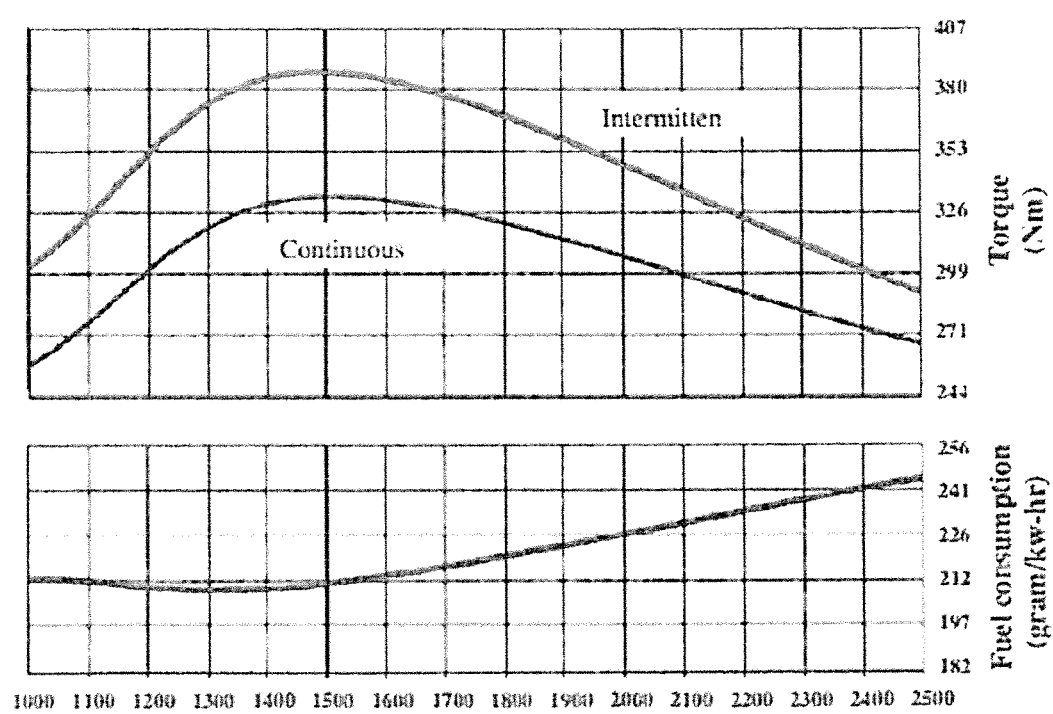
FIG. 4 shows the specification data and profile of Deutz's BF4M012 IC engine.

When the DEUTZ's BF4M2012 IC engine is employed to process the propulsion method, its working properties shown in FIG. 4 can be applied for the initial analysis. Referring to FIG. 4, it shows that the speed and torque associated with the most-desired working state are around 1350 RPM and 380 Nm. It also indicates that the fuel consumption rate corresponding to the most-desired working state is about 210 (gram/kw-hr). If this kind engine is designed to frequently do the work at the working state of output speed 2400 RPM and output torque of 300 Nm, then, the designated working state can be considered as the most-used working state, that is, the most-used speed is 2400 RPM and the most-used torque is 300 Nm. To employ the propulsion method, the transmission ratio is $$I = \frac{24}{13.5}$$

In this case, the transmitted torque from the engine shaft to the gear shaft is about 213 Nm. The torque changing ratio is about 28%. It suggests that the proposed propulsion method may not be adopted with this specific working state since the necessary condition is not satisfied, that is, the working torque is too small to handle the original torque requirement for vehicle propulsion.

A case-emphasized propulsion method developed using the second profile is now described.

Since the second profile of IC engine working properties is different from the first profile, the above-mentioned propulsion method cannot be used for an IC engine with the second profile. To know how the method can be applied with an IC engine possessing the second profile, the following example provides a detailed demonstration.

Example 3 is an application using YANMAR's 4LHA-150hp IC engine.

By observation of FIG. 5, it is known that Yanmar's 4LHA-150hp IC engine is a typical case of the second profile. To apply the propulsion method with such an engine, the most-desired speed should be chosen as slow as possible yielding the constraint of the output torque.

When a Yanmar's 4LHA-150hp IC engine is equipped to thrust a fully loaded boat, it often runs with the working state of output speed and output torque around 3200 RPM and 320 Nm respectively.

In such a case, the working state is considered as the most-used speed and the most-used torque. Referring to FIG. 5, the most-desired speed can be chosen around 2650 RPM since at this speed the output torque achieves the maximum value. If the most-desired working state is chosen with speed of 2650 RPM and output torque of 380 Nm, the corresponding fuel consumption is about $1.706 \times 10^5$ cm$^3$/hour. From FIG. 5, it can also determine the fuel consumption corresponding to the most-used working state, which is about $2.843 \times 10^5$ cm$^3$/hour. Therefore, to implement the proposed design method in this case, the transmission ratio with this design method will be $$I = \frac{3200}{2650} = \frac{64}{53}$$

This means that when the engine shaft is at the speed of 2650 RPM, the gear shaft will be 3200 RPM with an output torque $T_{3200\ RPM}$, and $$T_{3200\ RPM} = 380\frac{1}{I} = 315 \text{ Nm}$$

The output torque changing ratio of reduction is about $$T_l = \frac{320 - 315}{320} = 1.6\%$$

which should be tolerable. In this case, with the application of this method, the consumed fuel will reduce about $1.137 \times 10^5$ cm$^3$/hour. This means that the fuel consumption will decrease about $$\eta_l = \frac{2.843 \times 10^5 - 1.706 \times 10^5}{2.843 \times 10^5} = 40\%.$$

Considering the energy loss of the gear transmission, the reduction of fuel consumption is around 39%. Such an outcome is absolutely remarkable. Certainly, such a result is based on the assumption of the most-used working state; however, the example does show the possibility of great fuel saving with the proposed IC engine propulsion method.

In application, the working state of an engine is very different and uncertain. For better understanding, the following example will show that different working state conduct different energy saving. In this case, if the most-used working state is assumed to have the most-used speed of 2800 RPM and the most-used torque of 370 Nm, the corresponding fuel consumption is about $2.009 \times 10^5$ cm$^3$/hour. Therefore, the transmission ratio for this case to use the method will be $$I = \frac{2800}{1650} = \frac{56}{53}$$

Here, if the most-desired working state is the same as the last case, with this transmission ratio, transmission shaft will run at a speed of 2800 RPM with the output torque about $$T_{2800\ RPM} = 380\frac{1}{I} = 360 \text{ Nm}$$

The torque changing ratio of reduction will be around $$T_l = \frac{370 - 360}{370} = 2.7\%$$

which is less than 5%. In this case, if the reduction of the torque is considered acceptable, the fuel consumption will reduce about $$\eta_l = \frac{2.009 \times 10^5 - 1.706 \times 10^5}{2.009 \times 10^5} = 15\%.$$

Taking the energy loss of the gear transmission into consideration, the efficiency will still increase about 14% against the original fuel consumption. The result demonstrates that the improvement of fuel efficiency is also very significant.

Figure 8:
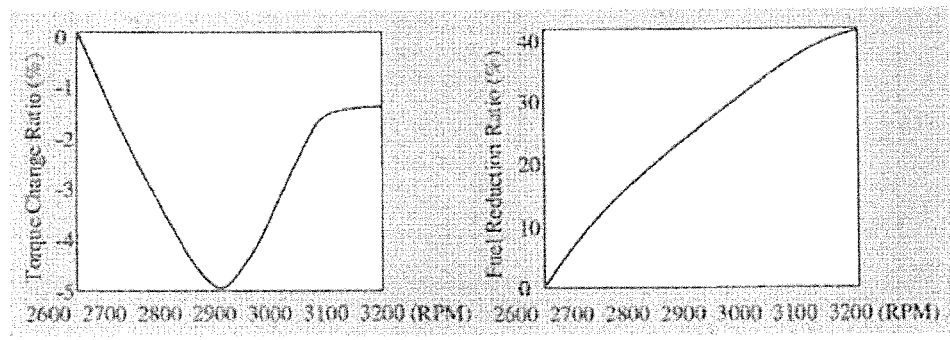
FIG. 8 shows torque changing and fuel reduction ratios with the most-used engine speed range.

The above analysis demonstrates that, if the conditions are optimum, the proposed propulsion method could decrease the fuel consumption up to 5~39% as comparison with the traditional way of propulsion. To different types of IC engines, the working profiles are very different. FIG. 8 below provides the basic information about the fuel reduction ratio and the torque changing ratio for the type of YANMAR's 4LHA-150hp Diesel Engine corresponding to the most-used speed range from 2650~3200 RPM. If the most-used working state of a YANMAR's 4LHA-150hp Diesel Engine is known, one can check the data of FIG. 8 to know if such a working state can make good use of the propulsion method with such a type of Diesel Engine. It is noted that, to each individual engine of this type, the profile of the fuel reduction ratio and the torque changing ratio corresponding to the most-used speed range may slightly different from FIG. 8 since this profile is developed from the mean value of tests of such a type. However, the statistical result is able to scientifically verify the proposed propulsion method and to ensure its application to save energy.

Design procedures of the generalized case-emphasized propulsion method are now described.

It is known that, in many applications, an IC engine is generally operated to run in various cases of the most-used working states. To resolve such a problem, a multiple ratio single-stage gear transmission should be used to implement the proposed case-emphasized propulsion control scheme. The following discussions provide the basic idea and procedure to determine the ratios of the single-stage gear transmission.

All of the most-used speeds and corresponding most-desired speeds are identified. If there are several different most-used working states for an IC engine powered vehicle, it is necessary to define these corresponding most-used speeds and most-used torques and to identify the most-desired working state one by one. For example, the IC engine of a four-seat passenger car may frequently run with one or more of the following four cases:

Case 1: The car is frequently driven on downtown resident streets under mean torque of $k_{e1}$ corresponding to a load of 2 persons at the mean speed $e_1$ which is equal to speed limit of 25 km/hour. (The corresponding most-desired speed in tests is $d_1$ and the corresponding most-desired torque is $k_{d1}$.)

Case 2: The car is frequently driven on downtown street under mean torque of $k_{e2}$ corresponding to a load of 2 persons at the mean speed $e_2$ which is equal to speed limit of 45 km/hour. (The corresponding most-desired speed in tests is $d_2$ and the corresponding most-desired torque is $k_{d2}$.)

Case 3: The car is frequently driven on country roads under mean torque of $k_{e3}$ corresponding to a load of 2 persons at the mean speed $e_3$ which is equal to speed limit of 80 km/hour. (The corresponding most-desired speed in tests is $d_3$ and the corresponding most-desired torque is $k_{d3}$.)

Case 4: The car is frequently driven on a freeway under mean torque of $k_{e4}$ that is corresponding to a load of 2 persons at the mean speed $e_4$ which is equal to speed limit of 110 km/hour. (The corresponding most-desired speed in tests is $d_4$ and the corresponding most-desired torque is $k_{d4}$.)

With this example, a 4-ratio single-stage gear transmission can be used to implement the case-emphasized propulsion method.

Next, the transmission ratios must be determined. Based on the above testing results, determine the transmission ratios corresponding to the above four cases, i.e., $$I_1 = \frac{e_1}{d_1}, I_2 = \frac{e_2}{d_2}, I_3 = \frac{e_3}{d_3}, \text{ and } I_4 = \frac{e_4}{d_4}$$

to transmit the most-desired speed to the corresponding most-used speed

Next, the necessary working condition must be checked. The necessary working condition that the propulsion method could be realized is that the output power of the IC engine at the most-desired working state is equal to or larger than the needed power corresponding to the most-used working state. Therefore, the following conditions must be true $$k_{d1} \geq k_{e1}, k_{d2} \geq k_{e2}, k_{d3} \geq k_{e3}, \text{ and } k_{d4} \geq k_{e4}$$

Once all the above conditions are true, this leads to the design of a single-stage gear transmission with corresponding transmission ratios $I_1$, $I_2$, $I_3$, and $I_4$. A corresponding transmission can always let the engine work around the most-desired working states, and guarantee the minimum fuel consumption.

A design of an N-ratio automatic transmission is now described.

For each different IC engine powered vehicle in a given application, the most-used working states and the most-desired working states could be very different. It is a challenge to develop a one-stage gear transmission of multiple ratios with high efficiency to execute the proposed propulsion method of the present invention as it must be compact in volume and light in weight as well as convenient in operation. Since the transmission ratios are uncertain for each of the customers based on the case-emphasized propulsion method, it is difficult to have a transmission with multiple ratios to meet the needs of all IC engine control of a vehicle in general. More critically, the uncertain transmission ratios cannot use mass production to achieve the cost-effectiveness of engineering.

To cover all kinds of different transmission ratios for different vehicles to achieve optimal fuel efficiency, one generalized solution is to use a continuous variable transmission (CVT). A CVT is able to provide a continuous transmission ratio to meet all kinds of different cases. It is noted that, if the mechanical efficiency was satisfied, a CVT would be the best choice to easily provide suitable transmission ratios to execute the case-emphasized propulsion method. Even though CVTs have been widely used in vehicles, the issue here is: "Can a CVT in the existing inventory be qualified to do so?"

Upon review of the above discussed prior arts, a serious concern is raised about using CVT to improve the fuel efficiency of a vehicle. By making full use of the IC engine's working characteristics, a CVT can control the IC engine and easily provide suitable transmission ratios to improve the IC engine output fuel efficiency. The problem is that, the mechanical efficiency of a CVT in the existing inventory does not appear qualified, and a CVT may actually drag down the overall fuel efficiency.

The hydraulic CVT technology is able to provide continuous transmission ratio and it has been widely equipped on vehicles. Disappointedly, the mechanical efficiency of CVT applied in vehicles is very low, which is usually around 80%. In recent years, the efficiency of hydraulic CVT used in vehicles has been improved, and the efficiency has been claimed up to 90~95% with the report published in New York Times entitled: "Hydraulic Transmission for Fuel Savings" by J. Faludi on Feb. 11, 2005. Unfortunately, there is no corresponding technical verification with this report as a reliable reference. Therefore, the efficiency of hydraulic transmission still can only be considered about 80%.

With the existing inventory of mechanical types of CVTs that are widely used in automotive transmission design today, in general, since these types of CVTs are all based on using frictional force to transmit power, the frictional consumption of energy is unavoidable. As a result, the efficiency of such types of CVT could never be satisfactory. With recent report in industry, the efficiency of an advanced mechanical CVT is around 80~90%. Further, the other creditable reference also considers the mechanical efficiency of mechanical CVT to be around 80%.

It is clear that if the current CVT technology were used to execute the case-emphasized propulsion method, it would worsen the overall fuel efficiency of an IC engine rather than improve it. Given this situation, a generalized solution to develop an n-ratio automatic transmission is proposed. Here, the "generalized" solution means that the development gives not only a generalized solution for the control of all the IC engines with two different profiles, but also provides a generalized solution of an almost CVT profile to approximate the required ratios yielding the case-emphasized survey for all different IC engine powered vehicles.

The design criteria of the n-ratio automatic transmission is now described.

The design criteria of a n-ratio automatic transmission to improve IC engine propulsion fuel efficiency according to the present invention are achieving not only the optimal IC engine fuel efficiency but also high overall power, transmitting efficiency of the drivetrain of the vehicle, providing the function of an almost continuous variable transmission, conducting cost-effective design and manufacturing with mass production that is suitable for all different cases, emulating an automatic transmission with the elimination of clutch that is convenient to operate, achieving high mechanical efficiency of transmission, and setting up specific control modes with the almost continuous variable transmission to cover all the possible cases of the most-used working states.

It is noted that if an IC engine with an nominal power output of $P_{out}$ is coupled with the traditional CVT transmission which possesses a mechanical efficiency of $\eta_m$, the output power after the transmission is $P_w$, and $$P_w = P_{out} \eta_m$$

If the same IC engine is applied with the proposed propulsion method, the power output will be $P_{nout}$, and $$P_{nout} = P_{out}(1+\eta_i)$$

Here, $\eta_i$ is the increase of fuel efficiency, and it is around 5~39% as above-mentioned if the condition of applying the propulsion method is fit. When the engine equips an n-ratio automatic transmission that has a mechanical efficiency $\eta_n$, the output power after the transmission is $$P_{nw} = P_{nout} \eta_n$$

With comparison of the two, the ratio of additional reduction of fuel consumption with the n-ratio automatic transmission is $$\text{Ratio of additional reduction} = \frac{P_{nw} - P_w}{P_w} = \frac{(1+\eta_i)\eta_n - \eta_m}{\eta_m}$$

Through the earlier discussions, it is known that $\eta_m$ is about 80~90% and $\eta_n$ is around 98%. Therefore, the maximum and the minimum ratios (refer to $R_{max}$ and $R_{min}$ respectfully) of fuel reduction can be calculated as follows [21, 22, 23] can be obtained as follows:

$$R_{max} = \frac{(1+39\%)98\% - 80\%}{80\%} = 70.2\%$$

and $$R_{min} = \frac{(1+5\%)98\% - 90\%}{90\%} = 14.3\%$$

The results demonstrate that, if an IC engine is applied with the proposed propulsion method and coupled with an n-ratio automatic transmission, it could reduce overall fuel consumption ∈[14.3%, 70.2%] in comparing to the traditional propulsion method and traditional CVT.

The conceptual design of a n-ratio automatic transmission is now described.

Based on above-discussed design philosophy and expectations, a possible conceptual design of a n-ratio automatic transmission is developed (refer to FIG. 9) to implement the propulsion method.

Figure 9:
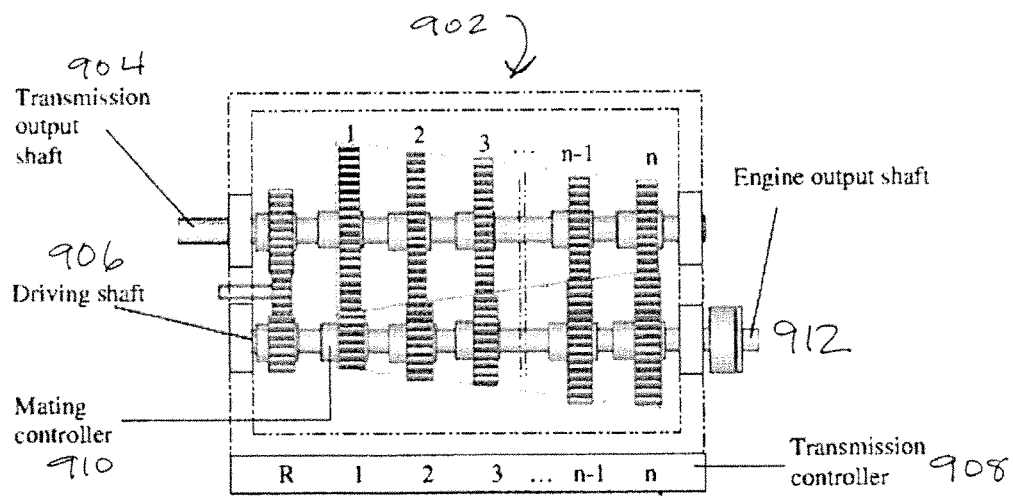
FIG. 9 shows a design of an n-ratio automatic single stage gear transmission according to the present invention.

With this design shown in FIG. 9, there are n numbers of gear pairs 902 that are mounted on the two shafts (transmission output shaft 904 and driving shaft 906, which is in turn coupled to the engine output shaft 912) of the single-stage gear transmission, which have corresponding transmission ratios of $I_1, I_2, \ldots, I_{n-1}, I_n$. Each gear pair is supported by bearings on the shaft to ensure that at least one gear of the pair can rotate around the shaft without restriction. Originally, all the gear pairs of n-ratio are mounted together with the fake mating state. This means that, at first, all the gear pairs mounted on the transmission shaft can rotate around the shaft with no restriction yielding the support of the rotational bearings. In application, the proper transmission ratio I close to the ratio of the most-used speed to the most desirable speed with an arbitrary case of propulsion can be matched by the transmission controller 908. If the ratio interval of the n-ratio automatic transmission is relatively narrow, the effect will be relatively good.

Figure 10:
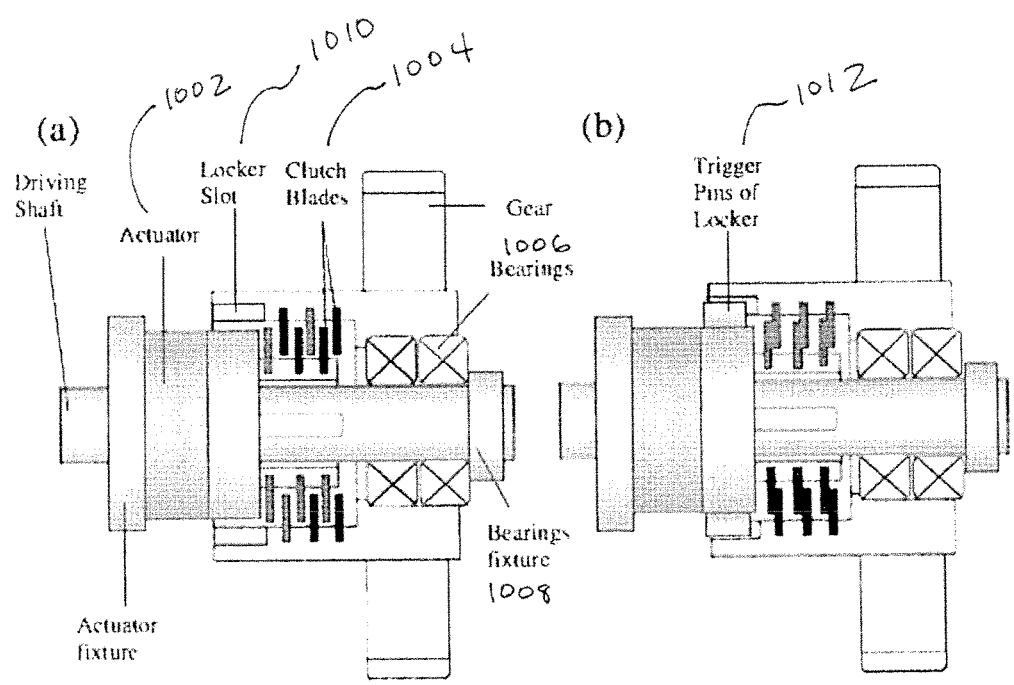
FIG. 10 shows a design of a mating controller according to the present invention.

All the mounted gear pairs 902 are under control by the mating controller 908 associated with each of the gear pairs 902. In the working process, only one gear pair can be engaged by the corresponding controller at a time to deliver the relevant transmission ratio, and the other gear pairs are all kept in the fake mating state, which will not consume energy since the acting force on each of the gear pair in fake mating state is negligible. FIG. 10 shows a possible conceptual design of the controller 910 previous shown in FIG. 9, and demonstrates the working principle of how it can control the gear pair to execute the propulsion method.

In FIG. 10, it shows the basic design of the mating controller. It shows that, if the gear pair is controlled to provide the corresponding transmission ratio, the electromagnetic actuator 1002 will be actuated. With the expansion of the actuator, the contacting force between the clutch blades 1004 will fix the gear on the shaft to rotate. In this way, this mating gear pair can begin to transmit power and motion. Obviously, at the same time, the other gear pairs that have not been locked will also rotate with bearings freely on the shaft. In this way, the support bearings 1006, 1008 experiences very small contact loads, and the resultant energy consumption can be ignored. Such a type of electromagnetic clutch has been widely used in CNC machine system control with excellent working performance.

Although the simple frictional clutch technology can provide an effective engagement to fix the gear on the shaft, one may argue that the application may cause extra energy loss because it has to provide constant pressure to have the friction force to fix the gear with the shaft and there may be always the relative displacement between the two sets of clutch blades 1004 to cause a waste of energy and to increase of frictional heat.

To resolve such issues, an extra locker can be developed with the mating controller. In FIG. 10 shows that, after the engagement of the frictional blades 1004, once the relative speed between the two rotating parts is slowed enough, the pins of a locker 1010, 1012 will be actuated in the slot to fix the two together and then all actuators can be released without the need to maintain the pressure. The pins will be controlled by a trigger system. If the gear pair i is in need of disengagement, the trigger system will be pushed down by a small actuator to set the gear pair i in a fake mating state. Thus, the above arguments can be fairly resolved.

It is noted that t are numbers of conventional technologies of clutches and lockers that can be conveniently adopted for the conceptual design. In order to realize the conceptual design, all different technologies of clutches and lockers should be compared against each other to locate the one capable of carrying out the above function effectively at low cost.

Alternative mating controllers suitable for use in the n-ratio automatic single-stage gear transmission shown in FIG. 9 are shown in FIG. 11(a), FIG. 11(b), FIG. 12(a), FIG. 12(b), FIG. 13, FIG. 14, FIG. 15, and FIG. 16.

Referring now to FIG. 11(a) a first alternative mating controller is shown in the separated state. The mating controller includes a driven member 1102, a driver 1104, an actuator 1106, an engaging ball 1108, and a shaft 1110. The actuator 1106 is in a first state such that the engaging ball 1108 does not make contact with the driven member 1102. Referring now to FIG. 11(b) the first alternative mating controller is shown in a fixed state, where the same elements are shown with the same reference numerals. The actuator 1106 is in a second state such that the engaging ball 1108 is forced to make contact with the driven member 1102. The electrical energy for the actuators can be provided through the shaft 1110 as is known in the art.

Figure 12:
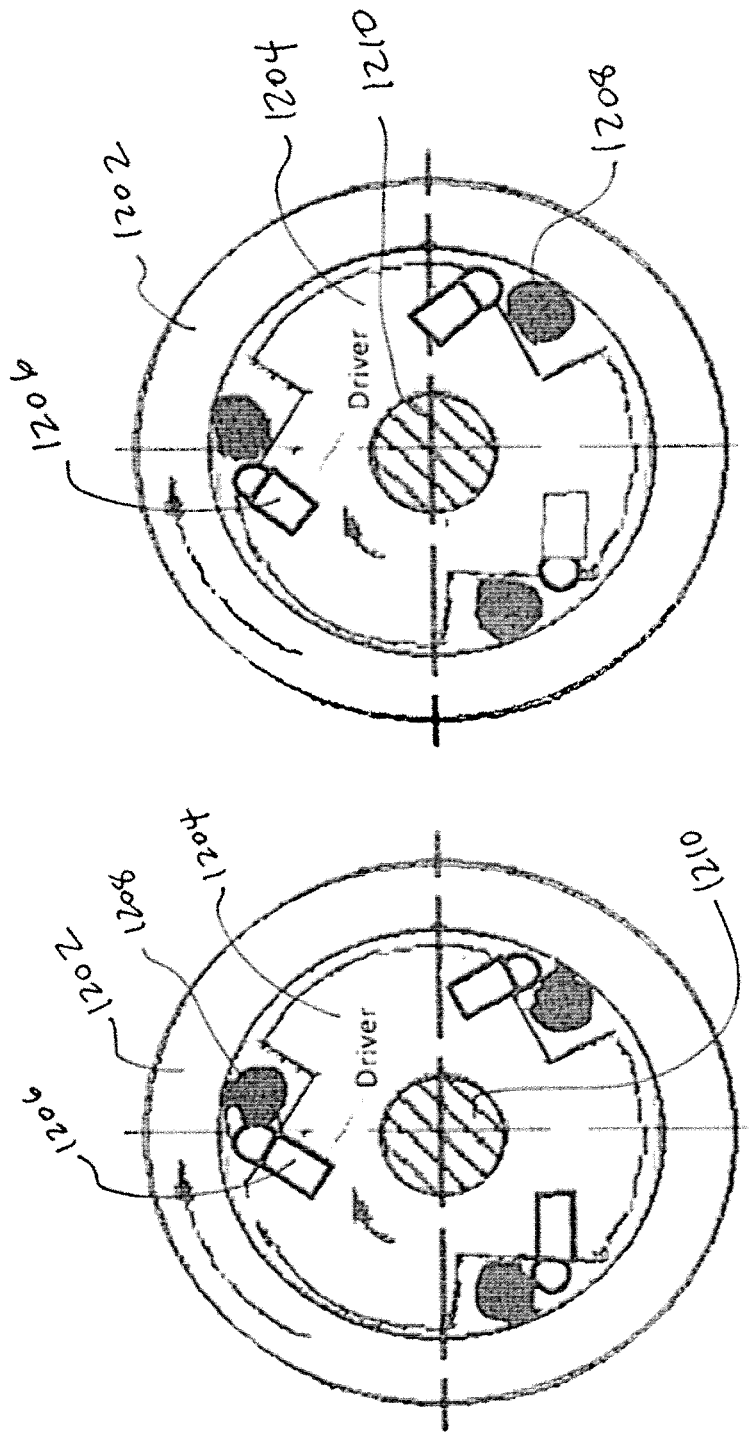

Referring now to FIG. 12(a) a second alternative mating controller is shown in the separated state. The mating controller includes a driven member 1202, a driver 1204, an actuator 1206 having a rounded tip, an engaging ball 1208, and a shaft 1210. The actuator 1206 is in a first state such that the engaging ball 1208 does not make contact with the driven member 1202. Referring now to FIG. 12(b) the first alternative mating controller is shown in a fixed state, where the same elements are shown with the same reference numerals. The actuator 1206 is in a second state such that the engaging ball 1208 is forced to make contact with the driven ember 1202. The electrical energy for the actuators can be provided through the shaft 1210 as is known in the art.

Figure 13:
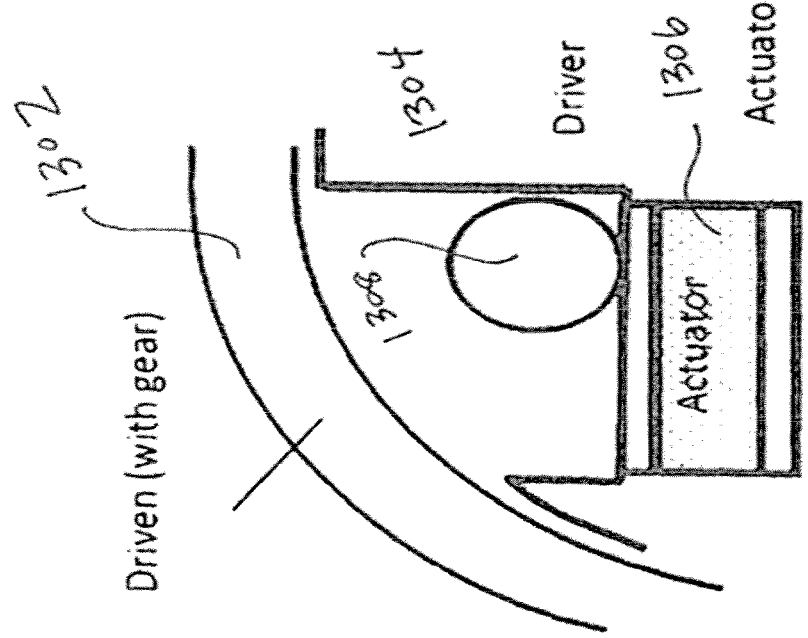
Figure 14:
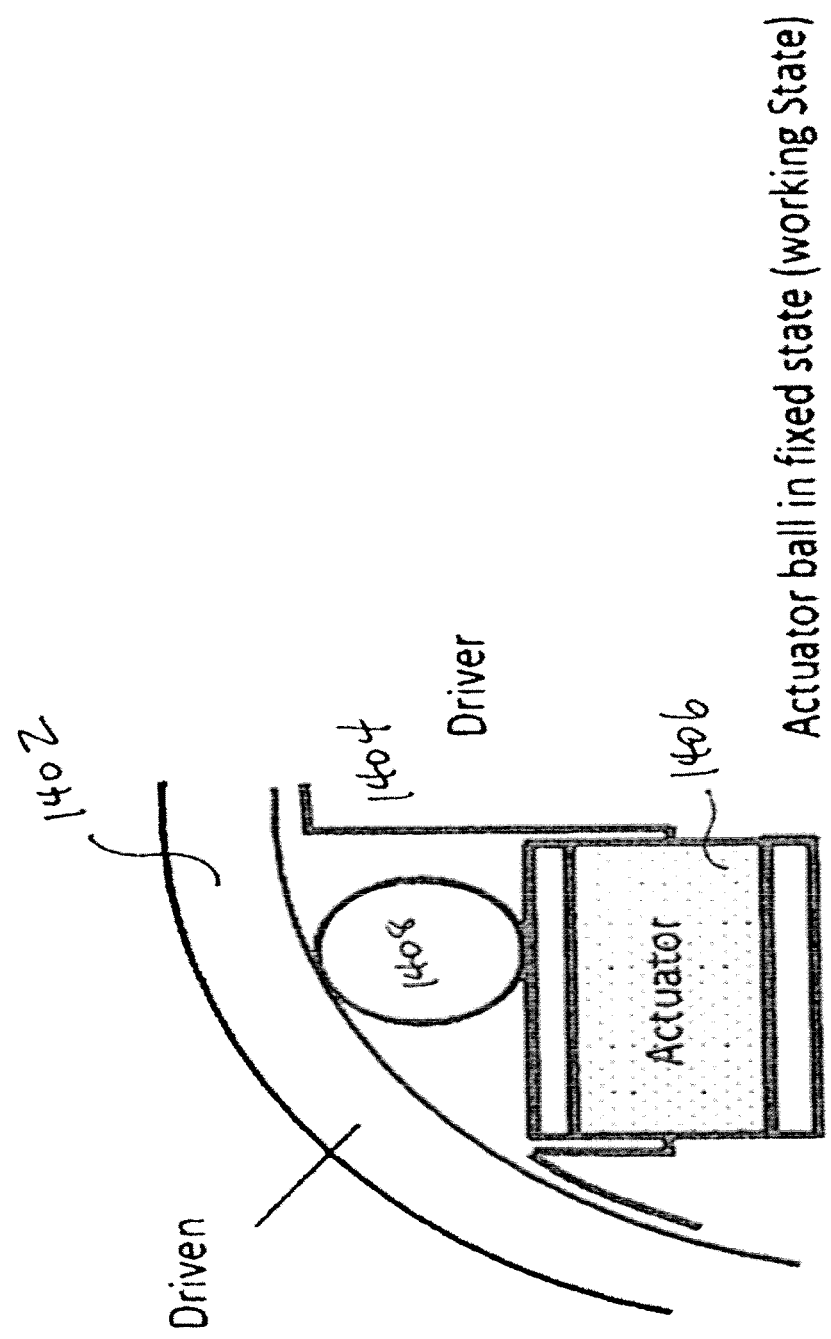

Referring now to FIG. 13, a close-up and partial view of the first alternative mating controller is shown in the separated state wherein the driven member 1302, the driver 1304, the actuator 1306, and the engaging ball 1308 are shown. Referring now to FIG. 14, a close-up and partial view of the first alternative mating controller is shown in the fixed state wherein the driven member 1402, the driver 1404, the actuator 1406, and the engaging ball 1408 are shown.

Figure 15:
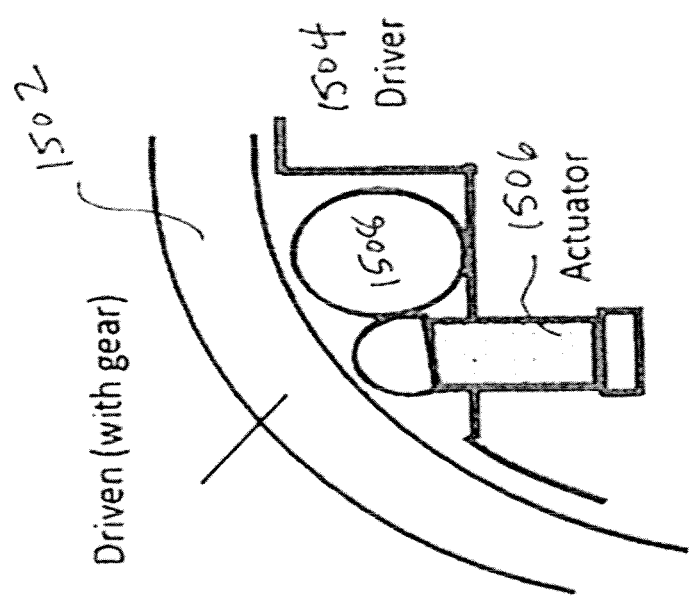
Figure 16:
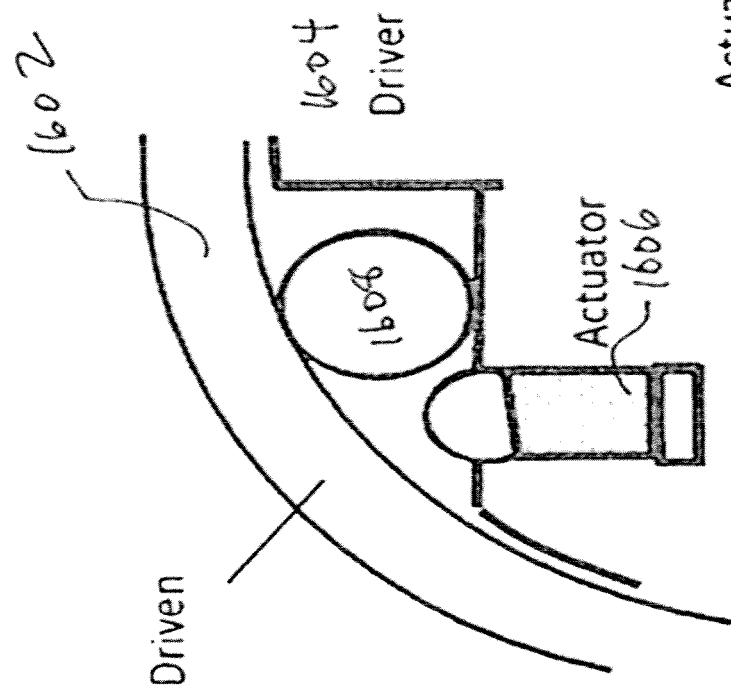

Referring now to FIG. 15, a close-up and partial view of the second alternative mating controller is shown in the separated state wherein the driven member 1502, the driver 1504, the actuator 1506, and the engaging ball 1508 are shown. Referring now to FIG. 16, a close-up and partial view of the second alternative mating controller is shown in the fixed state wherein the driven member 1502, the driver 1504, the actuator 1506, and the engaging ball 1508 are shown.

With the propulsion method and the corresponding n-rate transmission according to the present invention, the price of a vehicle will be higher than a conventional one because of the additional work and manufacturing cost. However, the following analysis indicates the benefits are worth the extra costs to carry out the propulsion method: no clutch is needed with the n-ratio automatic transmission, which can reduce the cost considerably, and the method and transmission according to the present invention could increase fuel efficiency $\in$[14.3%, 70.2%] by comparing with the traditional technology.

By considering that the mean of 42.25% fuel reduction can be accomplished, if the average travelling distance of a passenger car which has a low mileage of 10.5 km/Lite (25 mpg) is about 16000 km per year, then, it will save 644 litters (170 gallons) in one year. As the current price for one liter of gasoline is about $0.79~$1.06 ($3~$4 per gallon,) it will save an average of $49.61 per month. With reference of the MACRS-GDS (Modified Accelerated Cost Recovery System-General Depreciation System) Property Class of the US, the clarified life of a car is 5 years. In a relatively gloomy financial situation with a low annual interest rate of 2.5% compounded monthly, the gain from the saving of gasoline will be calculated with the uniform series compound amount as follows [24]:

$$\text{The gain} = A \frac{(1+i)^n - 1}{i} = \$49.61 \frac{(1+0.208\%)^{60} - 1}{0.208\%} = \$3167.22$$

Here, A is the monthly saving payment, i is the effective monthly compound interest rate of the loan, and n is the total time periods of clarified life of a car. The above benefits should well compensate the extra cost of the manufacturing of the transmission.

Additional considerations with the design are described.

By using a series of constant-open switches to control the n-ratio transmission in a row, the n-ratio transmission will increase or decrease the speed ratio gradually to have the effect of an almost CVT. Such an effect will make the operation of the vehicle convenient especially for these drivers who do not like to drive with the use of the manual transmission.

Furthermore, because the n-ratio automatic transmission is almost like a traditional CVT, it can be controlled as the traditional CVT to deal with the special case of hill-climbing with transmission near or just at the desired ratio.

As for vehicle reversing control, since it is an extreme case in application, and the time period is short, no special consideration about fuel efficiency is necessary. The traditional gear transmission for reversing process can be used here with the conceptual design. FIG. 9 shows the reverse (R) output of the transmission. All the controls associated with different cases of a vehicle can be designed in the way similar to the traditional CVT in an automatic/semi-automatic manner by means of embodiment of electro-mechanical systems.

To improve the efficiency of IC engine for vehicle propulsion, a generalized propulsion method has been provided. With this development, it can not only reduce the fuel consumption but also deliver a n-ratio transmission possessing high mechanical efficiency.

Through the theoretical verification of the propulsion method by using differ models of IC engine in the market place, the overall result shows that the fuel consumption of the engine could reduce about 5~39%. The conceptual design of the n-ratio automatic transmission with this research provides an effective way to execute the proposed propulsion method, which also provides an effective means to improve overall propulsion fuel efficiency. Significantly, in comparison with current IC engine propulsion coupled with traditional CVT, it could achieve the fuel reduction ∈[14.3%, 70.2%].

With this development, the cost of the new type of proposed transmission may be higher than before; however, the savings on gasoline can well compensate the manufacturing cost. In fact, the above-discussed saving is very conservative since the actual useful life of a car is much longer than the classified depreciation life. Therefore, the gain from savings on gasoline will actually be much higher, and consequently, should greatly compensate the higher price for the vehicle owner.

Furthermore, the significance of the method and transmission of the present invention is not just for saving money, and the following outcomes should be especially emphasized:

It is known that, in the United States alone, there are about 100 million cars running on the highway every year and the average mileage for a car is about 16000 kilometers. With this case-emphasized propulsion method, it could save about 64400 million litters (about 17014.5 million gallons) of gasoline each year. The result is definitely noteworthy.

To the automotive industry, obviously, such outcomes are helpful to achieve the goal of the stricter emissions limits for vehicles, and to attain the overall or industry average fuel efficiency standard. With expectation, the realization of this research should generate a great impact to the environment and the economy of our world.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An n-ratio automatic single-stage gear transmission comprising:
   a driving shaft;
   a transmission output shaft; and
   a plurality of gear pairs,
      wherein a first gear in the gear pair is selectively coupled to the driving shaft using a first mating controller,
      wherein a second gear in the gear pair is selectively coupled to the transmission output shaft using a second mating controller,
      wherein the gear pairs each have a distinct gear ratio, and
      wherein the first and second mating controllers comprise an engaging ball for effectuating a separated state and a fixed state
      wherein the first mating controller comprises a driven member coupled to the first gear, a driver coupled to the driving shaft, and an actuator for selectively positioning the engaging ball in the separated state and in the fixed state;
         wherein the actuator comprises a flat upper surface for interacting with the engaging ball.

2. The transmission of claim 1 comprising at least five gear pairs.

3. The transmission of claim 1, wherein power is supplied to the actuator through the driving shaft.

4. The transmission of claim 1 further comprising a reverse gear pair, wherein first and second gears of the gear pair are coupled together with a reverse gear.

5. The transmission of claim 1, further comprising a transmission controller for controlling the mating controllers.

6. The transmission of claim 1, wherein only one gear pair is coupled to the driving shaft and the transmission output shaft at a time.

7. The transmission of claim 1, wherein each gear ratio corresponds to a most-used working state for an internal combustion engine; wherein the most-used working state comprises a downtown resident street working state.

8. An n-ratio automatic single-stage gear transmission comprising:
   a driving shaft;
   a transmission output shaft; and
   a plurality of gear pairs,
      wherein a first gear in the gear pair is selectively coupled to the driving shaft using a first mating controller,
      wherein a second gear in the gear pair is selectively coupled to the transmission output shaft using a second mating controller,
      wherein the gear pairs each have a distinct gear ratio, and
      wherein the first and second mating controllers comprise an engaging ball for effectuating a separated state and a fixed state; and
   further comprising a transmission controller for controlling the mating controllers; wherein only one gear pair is coupled to the driving shaft and the transmission output shaft at a time; and
   wherein each gear ratio corresponds to a most-used working state for an internal combustion engine.

9. The transmission of claim 8, wherein the most-used working state comprises a downtown resident street working state.

10. The transmission of claim 9, wherein the downtown resident street working state comprises a speed limit of 25 km/hour.

11. The transmission of claim 9, wherein the downtown resident street working state comprises a speed limit of 45 km/hour.

12. The transmission of claim 8, wherein the most-used working state comprises a country roads working state.

13. The transmission of claim 8, wherein the most-used working state comprises a freeway working state.

14. An n-ratio automatic single-stage gear transmission comprising:
- a driving shaft;
- a transmission output shaft; and
- a plurality of gear pairs,
    - wherein a first gear in the gear pair is selectively coupled to the driving shaft using a first mating controller,
    - wherein a second gear in the gear pair is selectively coupled to the transmission output shaft using a second mating controller,
    - wherein the gear pairs each have a distinct gear ratio, and
    - wherein the first and second mating controllers comprise an engaging ball for effectuating a separated state and a fixed state
    - wherein the second mating controller comprises a driven member coupled to the second gear, a driver coupled to the transmission output shaft, and an actuator for selectively positioning the engaging ball in the separated state and in the fixed state
    - wherein the actuator comprises a flat upper surface for interacting with the engaging ball.

15. The transmission of claim 14, wherein power is supplied to the actuator through the transmission output shaft.

16. A method of improving the efficiency of an IC engine, the method comprising:
- providing a driving shaft coupled to an engine output shaft of an IC engine;
- providing a transmission output shaft; and
- providing a plurality of gear pairs,
    - wherein a first gear in the gear pair is selectively coupled to the driving shaft using a first mating controller,
    - wherein a second gear in the gear pair is selectively coupled to the transmission output shaft using a second mating controller,
    - wherein the gear pairs each have a distinct gear ratio, and
    - wherein the first mating controller comprises a first engaging ball and the second mating controller comprises a second engaging ball for effectuating a separated state and a fixed state;
    - wherein the first mating controller comprises a first driven member coupled to the first gear, a first driver coupled to the driving shaft, and a first actuator for selectively positioning the first engaging ball in the separated state and in the fixed state;
    - wherein the first actuator comprises a first flat upper surface for interacting with the first engaging ball;
    - wherein the second mating controller comprises a second driven member coupled to the second gear, a second driver coupled to the transmission output shaft, and a second actuator for selectively positioning the second engaging ball in the separated state and in the fixed state;
    - wherein the second actuator comprises a second flat upper surface for interacting with the second engaging ball.

\* \* \* \* \*